US010120831B1

(12) United States Patent
Sankroj et al.

(10) Patent No.: US 10,120,831 B1
(45) Date of Patent: Nov. 6, 2018

(54) CIRCUIT AND METHOD FOR HANDLING WRITE AND READ REQUESTS BETWEEN A MASTER CIRCUIT AND A SLAVE CIRCUIT IN DIFFERENT CLOCK DOMAINS

(71) Applicant: Xilinx, Inc., San Jose, CA (US)

(72) Inventors: Mahesh Sankroj, Secunderabad (IN); Jason Villarreal, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 73 days.

(21) Appl. No.: 15/367,611

(22) Filed: Dec. 2, 2016

(51) Int. Cl.
*G06F 13/42* (2006.01)
*G06F 13/364* (2006.01)
*G06F 13/16* (2006.01)
*G06F 13/40* (2006.01)

(52) U.S. Cl.
CPC ...... *G06F 13/4291* (2013.01); *G06F 13/1673* (2013.01); *G06F 13/364* (2013.01); *G06F 13/404* (2013.01)

(58) Field of Classification Search
CPC .......................... G06F 13/4291; G06F 13/1673
See application file for complete search history.

(56) References Cited

U.S. PATENT DOCUMENTS

| 7,076,595 B1 * | 7/2006 | Dao ..................... G06F 15/7867 710/100 |
| 7,539,789 B1 * | 5/2009 | Ogden ..................... G06F 5/065 365/189.011 |
| 2009/0228651 A1 * | 9/2009 | Sharma ............... G06F 11/2064 711/114 |
| 2015/0121066 A1 * | 4/2015 | Nix .......................... H04W 4/70 713/155 |

\* cited by examiner

*Primary Examiner* — Farley Abad
(74) *Attorney, Agent, or Firm* — LeRoy D. Maunu

(57) ABSTRACT

A circuit arrangement for handling write and read requests between a master circuit and a slave circuit in different clock domains includes first and second write FIFO circuits, a read FIFO circuit, and a write acknowledgment circuit. The first write FIFO circuit is configured and arranged to receive and buffer write addresses of write requests received from a master circuit and addressed to a slave circuit. The second write FIFO circuit is configured and arranged to receive and buffer write data associated with the write addresses of the write requests. The read FIFO circuit is configured and arranged to receive and buffer read addresses of read requests received from the master circuit and addressed to the slave circuit. The write acknowledgment control circuit is configured and arranged to transmit an acknowledgement to a write request to the master circuit before the slave circuit issues a response to the write request.

19 Claims, 3 Drawing Sheets

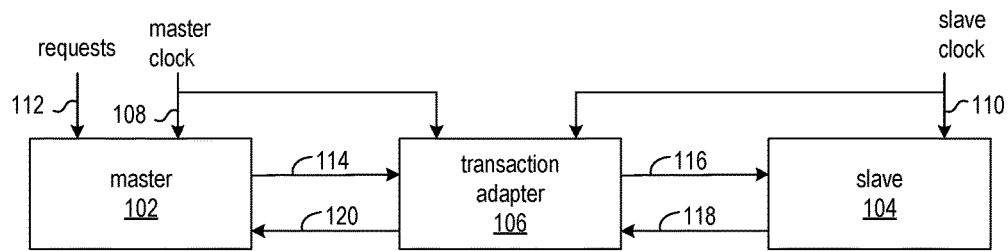
FIG. 1
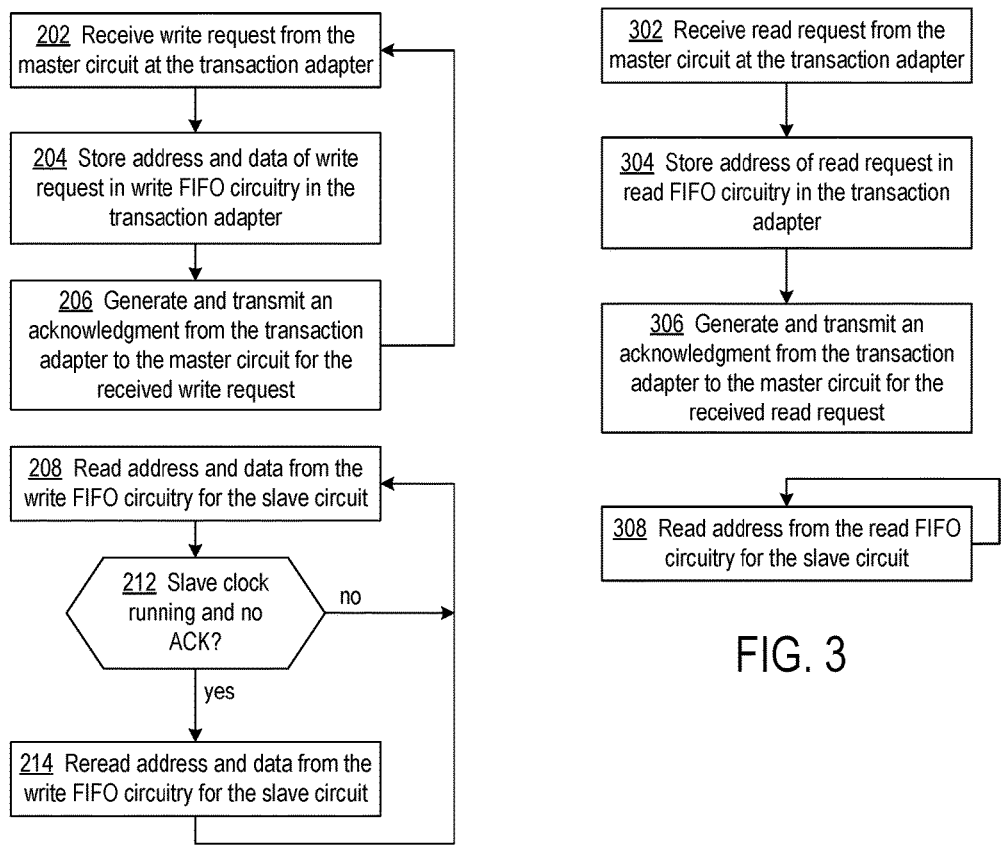
FIG. 2
FIG. 3

US 10,120,831 B1

CIRCUIT AND METHOD FOR HANDLING WRITE AND READ REQUESTS BETWEEN A MASTER CIRCUIT AND A SLAVE CIRCUIT IN DIFFERENT CLOCK DOMAINS

TECHNICAL FIELD

The disclosure generally relates to handling requests between master and slave circuitry operating in different clock domains.

BACKGROUND

An electronic system can have circuitry cooperatively operating in different clock domains. The clock domains can have clock signals that operate at different frequencies and/or are out of phase. In support of exchanging messages between the circuitry operating in the different clock domains, clock converter circuitry ("clock converter") maintains internal buffers that generally provide a continuous data flow between the different clock domains.

In some systems, the circuitry operating in the different clock domains functions in accordance with a request-acknowledge protocol. That is, when a first circuit operating in a first clock domain issues a request to a second circuit operating in a second clock domain, the first circuit expects an acknowledgment from the second circuit; the acknowledgement indicates that the request was received. If no acknowledgment is received, the first circuit considers the lack of an acknowledgement an error condition.

In some scenarios, the clock signal in the second clock domain may be purposely stopped or slowly pulsed, such as in debugging scenarios. When the clock signal in the second clock domain is purposely stopped or slowly pulsed, the first circuit in the first clock domain can continue to issue request messages and expect acknowledgements. If an acknowledgment is not timely received, the first circuit may reissue the request message, and the second circuit may again fail to provide a timely acknowledgement. Repeated cycles of requests and lack of timely acknowledgements may make the application appear inoperative without an indication of an error condition.

SUMMARY

A circuit arrangement for handling write and read requests between a master circuit and a slave circuit in different clock domains includes first and second write FIFO circuits, a read FIFO circuit, and a write acknowledgment circuit. The first write FIFO circuit is configured and arranged to receive and buffer write addresses of write requests received from a master circuit and addressed to a slave circuit. The second write FIFO circuit is configured and arranged to receive and buffer write data associated with the write addresses of the write requests. The read FIFO circuit is configured and arranged to receive and buffer read addresses of read requests received from the master circuit and addressed to the slave circuit. The write acknowledgment control circuit is configured and arranged to transmit an acknowledgement to a write request to the master circuit before the slave circuit issues a response to the write request.

Another circuit arrangement for handling write and read requests between a master circuit and a slave circuit in different clock domains includes a master circuit and a slave circuit coupled by a transaction adapter. The master circuit is configured and arranged to issue write requests and read requests, and the slave circuit is configured and arranged to process the write requests and read requests. The transaction adapter includes first and second write FIFO circuits, a read FIFO circuit, and a write acknowledgment circuit. The first write FIFO circuit is configured and arranged to receive and buffer write addresses of write requests received from a master circuit and addressed to a slave circuit. The second write FIFO circuit is configured and arranged to receive and buffer write data associated with the write addresses of the write requests. The read FIFO circuit is configured and arranged to receive and buffer read addresses of read requests received from the master circuit and addressed to the slave circuit. The write acknowledgment control circuit is configured and arranged to transmit an acknowledgement to a write request to the master circuit before the slave circuit issues a response to the write request.

According to a method for handling write and read requests between a master circuit and a slave circuit in different clock domains, write addresses of write requests received from the master circuit and addressed to the slave circuit are stored in a first write FIFO circuit of a transaction adapter. Write data associated with the write addresses of the write requests are stored in a second write FIFO circuit of the transaction adapter. Read addresses of read requests from the master circuit and addressed to the slave circuit are stored in a read FIFO circuit (406) of the transaction adapter. The transaction adapter transmits an acknowledgement to a write request to the master circuit before the slave circuit issues a response to the write request.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which:

FIG. 1 shows a circuit block diagram of circuit arrangement in which a master circuit, which is driven by a first clock signal, issues requests to a slave circuit, which is driven by a second clock signal;

FIG. 2 shows a flowchart of processes performed by the transaction adapter for write requests from a master circuit;

FIG. 3 shows a flowchart of processes performed by the transaction adapter for read requests from a master circuit;

DETAILED DESCRIPTION

Figure 4:
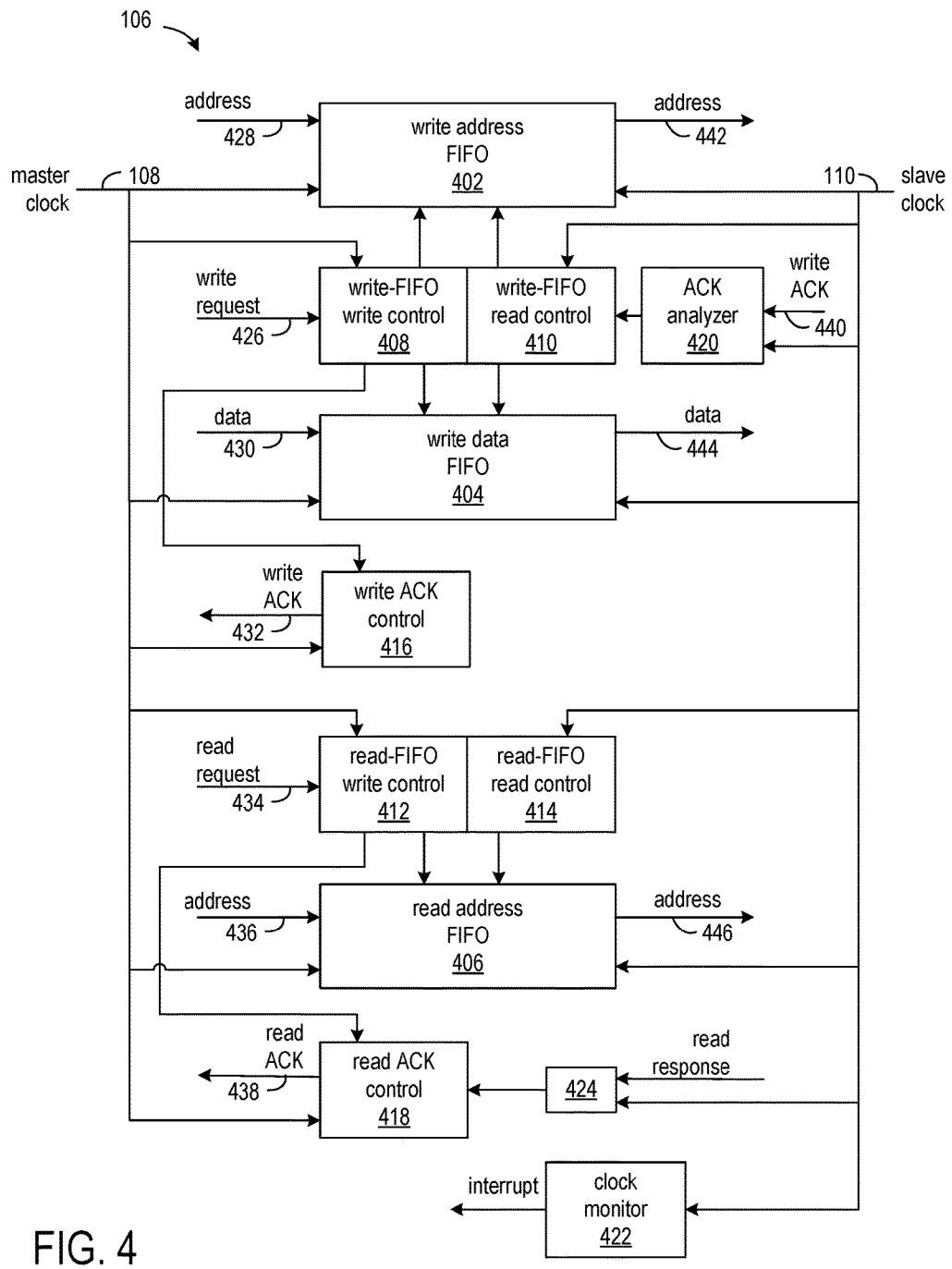
FIG. 4 shows a circuit diagram of transaction adapter according to one implementation.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

In some applications, such as debugging applications, a timely acknowledgment by a slave circuit to a request message from a master circuit may not be critical. For example, in the course of debugging a slave circuit, a circuit designer may intentionally direct the debugging tool to slow the pulse rate or stop the clock signal driving the slave circuit while the clock signal to the master circuit continues to run. In this scenario, the designer would not expect the debugging tool to hang. However, the master circuit may repeatedly send the request in the absence of an acknowledgment from the slave circuit, and eventually, the master circuit may timeout and return an error message or signal to the debugging tool. In the event that the debugging tool initiated stopping or slowing the clock signal driving the slave circuit, the debugging tool would not expect an error or for the master circuit to repeatedly issue a request in the absence of an acknowledgment.

The disclosed circuits and methods employ a transaction adapter that not only buffers read and write requests between the master circuit and slave circuit, but also issues responses to requests from the master circuit regardless of the state of the clock signal driving the slave circuit. The circuits include a write response circuit, along with first and second write FIFO circuits and a read FIFO circuit. The write response circuit transmits a response to a write request to the master circuit before the slave circuit issues a response to the write request. Thus, even if the clock signal driving the slave circuit has slowed or stopped, the master circuit is assured of receiving an acknowledgement in response to a request.

The first write FIFO circuit receives and buffers write addresses of write requests from the master circuit and addressed to a slave circuit. The second write FIFO circuit receives and buffers write data associated with the write addresses of the write requests. The read FIFO circuit receives and buffers read addresses of read requests from the master circuit and addressed to the slave circuit.

FIG. 1 shows a circuit block diagram of circuit arrangement in which a master circuit 102, which is driven by a first clock signal 108, issues requests to a slave circuit 104, which is driven by a second clock signal 110. The requests 112 include requests for the slave circuit to write specified data to specified registers (not shown) or memory locations (not shown), and requests for the slave circuit to read data from specified registers or memory locations. In an exemplary application, the requests can be from application-level circuitry (not shown) or a processor (not shown) executing software that interfaces with the master circuit. Requests input to the master circuit may be made according to the PCIe protocol, and requests from the master circuit to the slave circuit may be by AXI4-LITE, for example.

The transaction adapter 106 inputs both the master clock signal 108 and the slave clock signal 110 for controlling the buffer circuitry (not shown). The transaction adapter inputs requests from the master circuit on line 114 and issues requests to the slave circuit on line 116. Acknowledgements and responses from the slave circuit are transmitted to the transaction adapter on line 118, and the acknowledgments and responses are transmitted from the transaction adapter to the master circuit on line 120. The master clock signal and slave clock signal have different signal attributes, such as different frequencies and/or phases.

The transaction adapter 106 includes buffer circuitry (not shown) for buffering requests from the master circuit to the slave circuit to accommodate the different clock signal attributes of the master clock signal 108 and slave clock signal 110. The buffer circuitry receives and buffers write addresses and write data of write requests addressed to the slave circuit, and receives and buffers read addresses of read requests addressed to the slave circuit.

The transaction adapter issues an acknowledgment to a write/read request to the master circuit, independent of any acknowledgment returned by the referenced slave circuit. That is, even if the slave clock signal has been significantly slowed or stopped and the slave circuit is slowly receiving requests or has stopped receiving requests, the transaction adapter issues an acknowledgment to the master circuit.

FIG. 2 shows a flowchart of processes performed by the transaction adapter for write requests from a master circuit. At block 202 in a first write request process, the transaction adapter receives a write request from the master circuit. The address and data specified by the write request, as clocked by the master clock signal, are stored in FIFO circuitry of the transaction adapter at block 204. In response to receiving the write request, the transaction adapter at block 206 generates and transmits an acknowledgment to the master circuit without waiting to issue the write request to the slave circuit and without waiting for the slave circuit to issue an acknowledgment. Thus, even if the slave clock signal has been slowed or stopped, the master circuit will receive an acknowledgment for the write request. After generating and transmitting the acknowledgment, the transaction adapter returns to block 202 to receive another write transaction.

At block 208, in a second process running in parallel with the first process, the transaction adapter reads address and data of a write request from the FIFO circuitry. The reading of an address and data of a write request is clocked by the slave clock signal and enabled by the slave circuit. The transaction adapter transmits the address and data of the write request to the slave circuit.

At decision block 212, if the slave clock is running and no acknowledgment (ACK) to the address and data of a write request is received from the slave circuit, the transaction adapter proceeds to block 214. At block 214, the transaction adapter rereads the address and data of the write request from the write FIFO circuitry and retransmits the address and data to the slave circuit. The rereading of the address and data can be repeated until the slave circuit sends an acknowledgment or until a timeout period has expired. If the slave circuit sends an acknowledgment, the process of the transaction adapter returns to block 208 to read an address and data of another buffered write request.

FIG. 3 shows a flowchart of processes performed by the transaction adapter for read requests from a master circuit. At block 302 in a first process, the transaction adapter receives a read request from the master circuit. The address of the read request, as clocked by the master clock signal, is stored in FIFO circuitry of the transaction adapter at block 304. In response to receiving the read request, the transaction adapter at block 306 generates and transmits an acknowledgment to the master circuit without waiting to issue the read request to the slave circuit and without waiting for the slave circuit to issue an acknowledgment. Thus, even if the slave clock signal has been slowed or stopped, the master circuit will receive an acknowledgment for the read request. After generating and transmitting the acknowledgment, the transaction adapter returns to block 302 to receive another read request.

At block 308 in a second read request process running in parallel with the first read request process, the transaction adapter reads the address of a read request from the FIFO circuitry. The reading of the address of a read request is clocked by the slave clock signal and enabled by the slave circuit. The transaction adapter transmits the address of the read request to the slave circuit.

FIG. 4 shows a circuit diagram of transaction adapter 106 according to one implementation. The transaction adapter includes a write address FIFO circuit 402, a write data FIFO circuit 404, and a read address FIFO circuit 406. The write-FIFO write control circuit 408 controls writing to the write address FIFO circuit 402 and the write data FIFO circuit 404. The write-FIFO read control circuit 410 controls reading from the write address FIFO circuit 402 and the write data FIFO circuit 404. The read-FIFO write control circuit 412 controls writing to the read address FIFO circuit 406, and the read-FIFO read control circuit 414 controls reading from the read address FIFO circuit 406.

A write request control signal on signal line 426 input to the write-FIFO write control circuit 408 indicates availability of a write address on signal line 428 and write data on signal line 430 for storage in the write address FIFO circuit 402 and the write data FIFO circuit 404, respectively. The master clock signal 108 is distributed to the write port of the write address FIFO circuit 402, to the write port of the write data FIFO circuit 404, and to the write-FIFO write control circuit 408.

The write-FIFO write control circuit 408 signals the write ACK control circuit 416 in response to receipt of a write request and successful storage of the address and data of the write request in the write address FIFO circuit 402 and the write data FIFO circuit 404. The write ACK control circuit generates an acknowledgment to the write request (write ACK) and transmits the acknowledgement on signal line 432. The acknowledgment to the write request is issued independent of the status of the slave clock signal. Thus, the write acknowledgment is transmitted before the slave circuit receives the write request, and even if the slave clock 110 is stopped, the write ACK control circuit 416 transmits a write acknowledgment.

The write-FIFO read control circuit 410 is clocked by the slave clock signal 110 and reads an address from the write address FIFO circuit 402 and data from the write data FIFO circuit 404 for the slave circuit. The slave clock signal 110 is connected to the read ports of the write address FIFO circuit 402 and the write data FIFO circuit 404. The address is transmitted to the slave circuit on signal line 442, and the data is transmitted to the slave circuit on signal line 444.

The write-FIFO write control circuit 408 maintains write pointers that reference locations in memories of the write address FIFO circuit 402 and write data FIFO circuit 404 at which the address and data of the next write request are stored. Similarly, the write-FIFO read control circuit 410 maintains read pointers that reference locations in memories of the write address FIFO circuit 402 and write data FIFO circuit 404 from which the address and data of a write request are read for the slave circuit. The write-FIFO write control circuit and the write-FIFO read control circuit can guard against overflow and underflow conditions in the write address FIFO circuit and write data FIFO circuit by checking the values of the write pointers against the read pointers.

A read request control signal on signal line 434 input to the read-FIFO write control circuit 412 indicates availability of a read address on signal line 436 for storage in the read address FIFO circuit 406. The master clock signal 108 is distributed to the write port of the read address FIFO circuit 406 and to the read-FIFO write control circuit 412.

The read-FIFO write control circuit 412 signals the read ACK control circuit 418 in response to receipt of a read request and successful storage of the address of the read request in the read address FIFO circuit 406. The read ACK control circuit generates an acknowledgment to the read request (read ACK) and transmits the acknowledgement on signal line 438. The acknowledgment to the read request is issued independent of the status of the slave clock signal. Thus, the read acknowledgment is transmitted before the slave circuit receives the read request, and even if the slave clock 110 is stopped, the read ACK control circuit 416 transmits an acknowledgment of the read request.

The read-FIFO read control circuit 414 is clocked by the slave clock signal 110 and reads an address from the read address FIFO circuit 406. The slave clock signal 110 is connected to the read port of the read address FIFO circuit 406. The address is transmitted to the slave circuit on signal line 446. The read-FIFO write control circuit 412 and read-FIFO read control circuit 414 maintain pointers for writing to and reading from the read address FIFO circuit 406 and for preventing overflow and underflow of the read address FIFO circuit.

In the event that the slave clock signal 110 is stopped, the write-FIFO write control circuit 408 continues to buffer addresses and data of write requests in the write address FIFO circuit 402 and the write data FIFO circuit 404. Likewise, the read-FIFO write control circuit 412 continues to buffer addresses of read requests in the read address FIFO circuit 406 when the slave clock signal is stopped. When the slave clock signal is stopped, the write-FIFO read control circuit 410 and the read-FIFO read control circuit 414 stop reading from the respective FIFO circuits. Once the slave clock signal starts running, the write-FIFO read control circuit 410 and the read-FIFO read control circuit 414 resume reading from the respective FIFO circuits.

The transaction adapter 106 can further include an acknowledgment (ACK) analyzer circuit 420 that receives write acknowledgments from the slave circuit on signal line 440 and monitors the state of the slave clock signal 110. If the slave clock signal is running, and the acknowledgment analyzer circuit does not receive an acknowledgment from the slave circuit within an expected period of time after the address and data are read from the write address FIFO circuit and write data FIFO circuit 404, the acknowledgment analyzer circuit re-transmits the write address from the write address FIFO circuit and the corresponding data from the write data FIFO circuit to the slave circuit. The acknowledgment analyzer circuit re-transmits by signaling the write-FIFO read control to re-read from the write address FIFO circuit and the write data FIFO circuit.

The transaction adapter can further include a clock monitor circuit 422 that is coupled to receive the slave clock signal 110. The clock monitor circuit generates an interrupt signal to the master circuit in response to detecting that the slave clock signal stopped.

As the read acknowledgment control circuit provides read acknowledgments to the master circuit, acknowledgments to read requests from the slave circuit can be ignored. Circuit block 424 receives acknowledgements to read requests from the slave circuit. The acknowledgments may either be discarded by the circuit block 424 or interpreted by the read ACK control circuit 418. Optionally, the read ACK control circuit can initiate a request to resend a previous transaction and indicate the resend request by the acknowledgment type on line 438.

Figure 5:
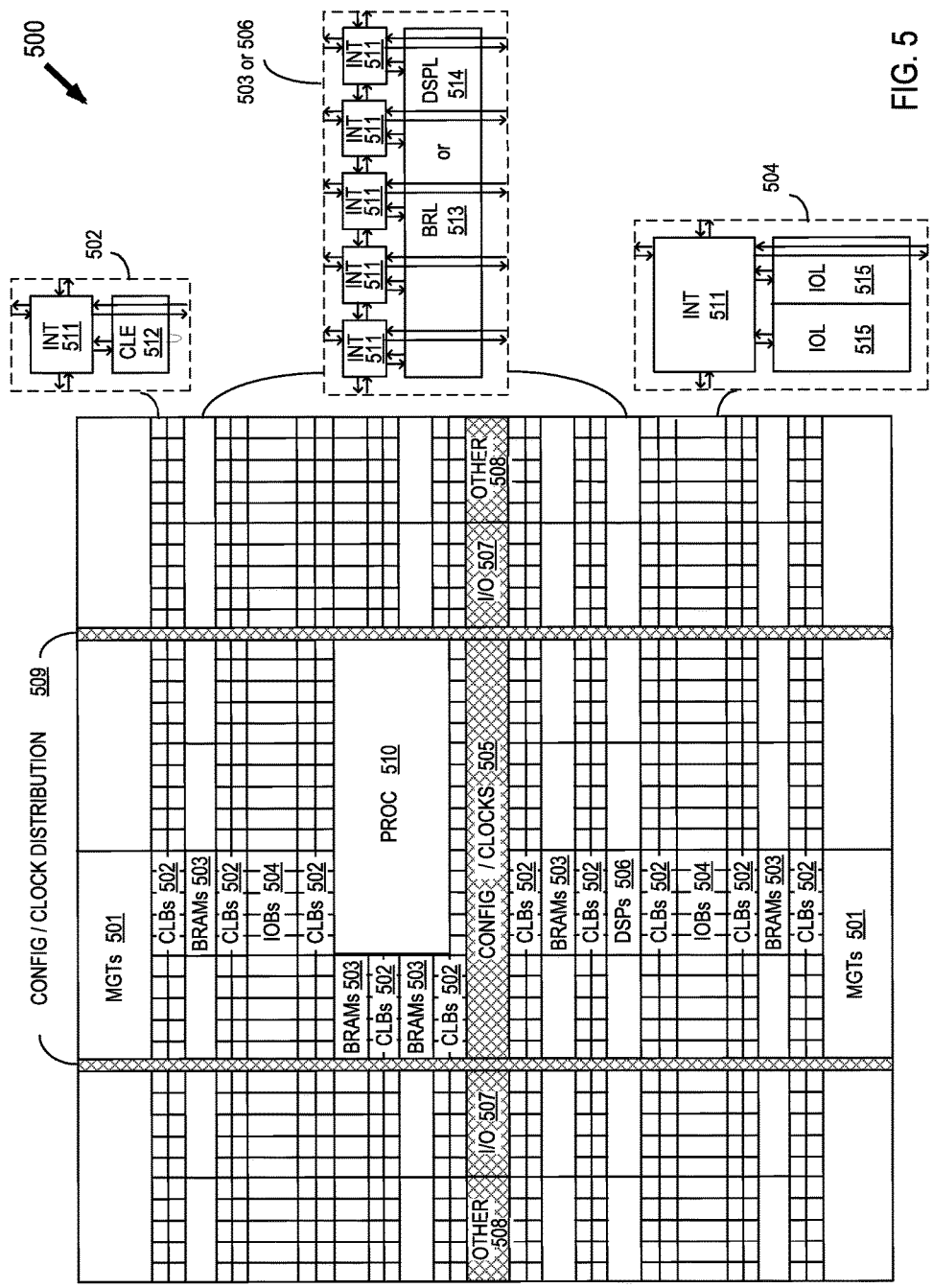
FIG. 5 shows a programmable integrated circuit (IC) on which the disclosed circuits and processes may be implemented.

FIG. 5 shows a programmable integrated circuit (IC) 500 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and circuits are thought to be applicable to a variety of systems for conveying write requests and read requests between master and slave circuits in different clock domains. Other aspects and features will be apparent to those skilled in the art from consideration of the specification. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   a first write FIFO circuit configured and arranged to receive and buffer write addresses of write requests from a master circuit and addressed to a slave circuit, wherein the first write FIFO circuit has a write port clocked by a first clock signal and a read port clocked by a second clock signal;
   a second write FIFO circuit configured and arranged to receive and buffer write data associated with the write addresses of the write requests, wherein the second write FIFO circuit has a write port clocked by the first clock signal and a read port clocked by the second clock signal;
   a read FIFO circuit configured and arranged to receive and buffer read addresses of read requests from the master circuit and addressed to the slave circuit; and
   a write acknowledgement control circuit configured and arranged to transmit an acknowledgement to a write request to the master circuit before the slave circuit issues a response to the write request, wherein the write acknowledgement control circuit is further configured and arranged to transmit an acknowledgement to a write address received when the second clock signal is running and to transmit an acknowledgement to a write address received when the second clock signal is stopped.

2. The circuit arrangement of claim 1, wherein the first clock signal has signal attributes different from signal attributes of the second clock signal.

3. The circuit arrangement of claim 1, wherein the first clock signal and the second clock signal have different clock frequencies.

4. The circuit arrangement of claim 1, wherein the first clock signal is faster and the second clock signal have different phases.

5. The circuit arrangement of claim 1, wherein the write acknowledgement control circuit is further configured and arranged to transmit an acknowledgement to a write address received when the second clock signal is running at a first rate and to transmit an acknowledgement to a write address received when the second clock signal is running at a second rate that is less than the first rate.

6. The circuit arrangement of claim 1, wherein the write acknowledgement control circuit is further configured and arranged to:
   transmit an acknowledgement to a write address received when the second clock signal is running at a first rate;
   transmit an acknowledgement to a write address received when the second clock signal is stopped; and
   transmit an acknowledgement to a write address received when the second clock signal is running at a second rate that is less than the first rate.

7. The circuit arrangement of claim 1, further comprising a read acknowledgement control circuit configured and arranged to transmit an acknowledgement to a read address to the master circuit before the slave circuit responds to the read address.

8. The circuit arrangement of claim 1, wherein:
the first clock signal has signal attributes different from signal attributes of the second clock signal; and
the circuit arrangement further includes an acknowledgement analyzer circuit configured and arranged to:
receive responses from the slave circuit; and
re-transmit a write address from the first write FIFO circuit and corresponding write data from the second write FIFO circuit to the slave circuit in response to the second clock signal running and the acknowledgement analyzer circuit not receiving a response from the slave circuit for a previous transmission of the write address and the corresponding write data to the slave circuit.

9. The circuit arrangement of claim 1, wherein:
the first clock signal has signal attributes different from signal attributes of the second clock signal; and
the circuit arrangement further includes a clock monitor circuit configured and arranged to:
monitor the second clock signal; and
generate an interrupt signal to the master circuit in response to detecting that the second clock signal stopped.

10. A circuit arrangement, comprising:
a master circuit configured and arranged to issue write requests and read requests;
a slave circuit configured and arranged to process the write requests and read requests; and
a transaction adapter coupling the master circuit to the slave circuit, wherein the transaction adapter includes:
a first write FIFO circuit configured and arranged to receive and buffer write addresses of the write requests from the master circuit and addressed to the slave circuit, wherein the first write FIFO circuit has a write port clocked by a first clock signal and a read port clocked by a second clock signal;
a second write FIFO circuit configured and arranged to receive and buffer write data associated with the write addresses of the write requests, wherein the second write FIFO circuit has a write port clocked by the first clock signal and a read port clocked by the second clock signal;
a read FIFO circuit configured and arranged to receive and buffer read addresses of the read requests from the master circuit and addressed to the slave circuit; and
a write acknowledgement control circuit configured and arranged to transmit an acknowledgement to a write request to the master circuit before the slave circuit issues a response to the write request, wherein the write acknowledgement control circuit is further configured and arranged to transmit an acknowledgement to a write address received when the second clock signal is running at a first rate, and transmit an acknowledgement to a write address received when the second clock signal is stopped.

11. The circuit arrangement of claim 10, wherein
the first clock signal has signal attributes different from signal attributes of the second clock signal.

12. The circuit arrangement of claim 10, wherein
the first clock signal and the second clock signal have different clock frequencies.

13. The circuit arrangement of claim 10, wherein
the first clock signal is faster and the second clock signal have different phases.

14. The circuit arrangement of claim 13, wherein the write acknowledgement control circuit is further configured and arranged to
transmit an acknowledgement to a write address received when the second clock signal is running at a second rate that is less than the first rate.

15. A method of processing requests from a master circuit to a slave circuit, comprising:
storing in a first write FIFO circuit of a transaction adapter, write addresses of write requests from the master circuit and addressed to the slave circuit;
inputting a first clock signal to a write port of the first write FIFO circuit and inputting a second clock signal to a read port of the first write FIFO circuit, wherein the first clock signal has signal attributes different from signal attributes of the second clock signal;
storing in a second write FIFO circuit of the transaction adapter, write data associated with the write addresses of the write requests;
inputting the first clock signal to a write port of the second write FIFO circuit and inputting the second clock signal to a read port of the second write FIFO circuit;
storing in a read FIFO circuit of the transaction adapter, read addresses of read requests from the master circuit and addressed to the slave circuit;
transmitting by the transaction adapter, an acknowledgement to a write request to the master circuit before the slave circuit issues a response to the write request;
transmitting an acknowledgement to a write address received when the second clock signal is running at a first rate;
transmitting an acknowledgement to a write address received when the second clock signal is stopped.

16. The method of claim 15,
wherein the first clock signal has signal attributes different from signal attributes of the second clock signal.

17. The method of claim 15,
wherein the first clock signal and the second clock signal have different clock frequencies.

18. The method of claim 15,
wherein the first clock signal is faster and the second clock signal have different phases.

19. The method of claim 15, further comprising
transmitting an acknowledgement to a write address received when the second clock signal is running at a second rate that is less than the first rate.

* * * * *